United States Patent
Bilinski et al.

(10) Patent No.: US 9,021,088 B2
(45) Date of Patent: Apr. 28, 2015

(54) PLAYLIST GENERATION

(75) Inventors: Brandon Bilinski, San Francisco, CA (US); Curtis Glenn Hawthorne, Mountain View, CA (US); Owen Daniel Otto, Oakland, CA (US)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 13/461,736

(22) Filed: May 1, 2012

(65) Prior Publication Data

US 2013/0297686 A1 Nov. 7, 2013

(51) Int. Cl.
*G06F 17/00* (2006.01)
*G06F 3/038* (2013.01)
*G06F 17/30* (2006.01)
*H04L 29/06* (2006.01)

(52) U.S. Cl.
CPC .......... *G06F 17/30053* (2013.01); *H04L 65/60* (2013.01)

(58) Field of Classification Search
CPC ................... G06F 17/30772; G06F 17/30053; H04L 65/60
USPC ......... 709/204, 213, 224, 231, 250, 227, 217; 715/700, 716, 739, 741–748; 719/312; 725/10–11, 105, 113, 117, 37–61; 370/464
See application file for complete search history.

(56) References Cited

U.S. PATENT DOCUMENTS

| | | | |
|---|---|---|---|
| 2002/0175953 A1* | 11/2002 | Lin | 345/811 |
| 2006/0143236 A1* | 6/2006 | Wu | 707/104.1 |
| 2009/0265426 A1 | 10/2009 | Svendsen et al. | |
| 2009/0276709 A1 | 11/2009 | Venneman et al. | |
| 2009/0327035 A1 | 12/2009 | Allard | |
| 2010/0094935 A1* | 4/2010 | Svendsen et al. | 709/204 |
| 2011/0314388 A1 | 12/2011 | Wheatley | |
| 2012/0222133 A1* | 8/2012 | Kidron | 726/28 |

FOREIGN PATENT DOCUMENTS

KR 10-2011-0058169 A 6/2011

OTHER PUBLICATIONS

International Search Report and Written Opinion for International Application No. PCT/US2013/039052 mailed Nov. 13, 2013.

* cited by examiner

*Primary Examiner* — Larry Donaghue
(74) *Attorney, Agent, or Firm* — Morris & Kamlay LLP

(57) ABSTRACT

A method, computer program product, and computing system for monitoring, with a computing device, a social media stream for the occurrence of a media sharing post. The media sharing post is processed, with the computing device, to extract file identification information. A playlist entry based, at least in part, upon the extracted file identification information is generated with the computing device. A media sharing playlist is populated, with the computing device, to include the playlist entry.

23 Claims, 7 Drawing Sheets

PLAYLIST GENERATION

TECHNICAL FIELD

This disclosure relates to media playlists and, more particularly, to the automated generation of media playlists.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites, social networks, and topical blogs.

Users of a media consumption system may purchase media files for personal use. Examples of such media files may include but are not limited to music files and video files. When such media files are obtained (and depending upon the media consumption system utilized), the purchased media files may include a limited set of sharing rights. For example when music files are purchased, the purchaser of the media file may be allowed to "share" the purchased media file (on a limited basis) with various people to whom the purchaser is connected within a social network (e.g., via a media sharing post to their media stream).

For example, these limited sharing rights may allow the purchaser to "share" the purchased media file with the recipients so that the recipients may listen to/view the shared media file a single time. Further, these limited sharing rights may be configured so that after the purchased media file is listened to/viewed, the recipient may only subsequently e.g. listen to/view a small portion of the media file (e.g. several seconds to several minutes). Accordingly, the use of such a system may allow for the controlled "viral" sharing of media files across social networks.

Unfortunately, as users of social networks often have a considerable number of "friends", the quantity of "posts" made to their social media stream may be considerable. For example, if a user has three hundred "friends" and each of them makes two posts per day (e.g., covering topics such as what they had for breakfast to where they are going during the day), the user may be greeted with six hundred unread posts at the end of the day. Accordingly, in the event that one or two of those six-hundred posts concerns the sharing of a media file (in the limited-rights fashion described above), it is easy to see how such media sharing posts may be lost amongst all of the general posts made to the user's social media stream.

SUMMARY OF DISCLOSURE

In a first implementation, a computer-implemented method includes monitoring, with a computing device, a social media stream for the occurrence of a media sharing post. The media sharing post is processed, with the computing device, to extract file identification information. A playlist entry based, at least in part, upon the extracted file identification information is generated with the computing device. A media sharing playlist is populated, with the computing device, to include the playlist entry.

One or more of the following features may be included. The media sharing playlist may be published, with the computing device, within a media consumption graphical user interface. The media sharing playlist may be published, with the computing device, within a social media graphical user interface. The playlist entry may include one or more social media comments. The playlist entry may include a sharer identifier. The media sharing post may define a limited set of sharing rights for a shared media file. The shared media file may include one of a shared music file and a shared video file.

In another implementation, a computer program product resides on a computer readable medium and has a plurality of instructions stored on it. When executed by a processor, the instructions cause the processor to perform operations including monitoring, with a computing device, a social media stream for the occurrence of a media sharing post. The media sharing post is processed, with the computing device, to extract file identification information. A playlist entry based, at least in part, upon the extracted file identification information is generated with the computing device. A media sharing playlist is populated, with the computing device, to include the playlist entry.

One or more of the following features may be included. The media sharing playlist may be published, with the computing device, within a media consumption graphical user interface. The media sharing playlist may be published, with the computing device, within a social media graphical user interface. The playlist entry may include one or more social media comments. The playlist entry may include a sharer identifier. The media sharing post may define a limited set of sharing rights for a shared media file. The shared media file may include one of a shared music file and a shared video file In another implementation, a computing system includes at least one processor and at least one memory architecture coupled with the at least one processor. One or more software modules are executed on the at least one processor and the at least one memory architecture and perform operation including monitoring, with a computing device, a social media stream for the occurrence of a media sharing post. The media sharing post is processed, with the computing device, to extract file identification information. A playlist entry based, at least in part, upon the extracted file identification information is generated with the computing device. A media sharing playlist is populated, with the computing device, to include the playlist entry.

One or more of the following features may be included. The media sharing playlist may be published, with the computing device, within a media consumption graphical user interface. The media sharing playlist may be published, with the computing device, within a social media graphical user interface. The playlist entry may include one or more social media comments. The playlist entry may include a sharer identifier. The media sharing post may define a limited set of sharing rights for a shared media file. The shared media file may include one of a shared music file and a shared video file The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
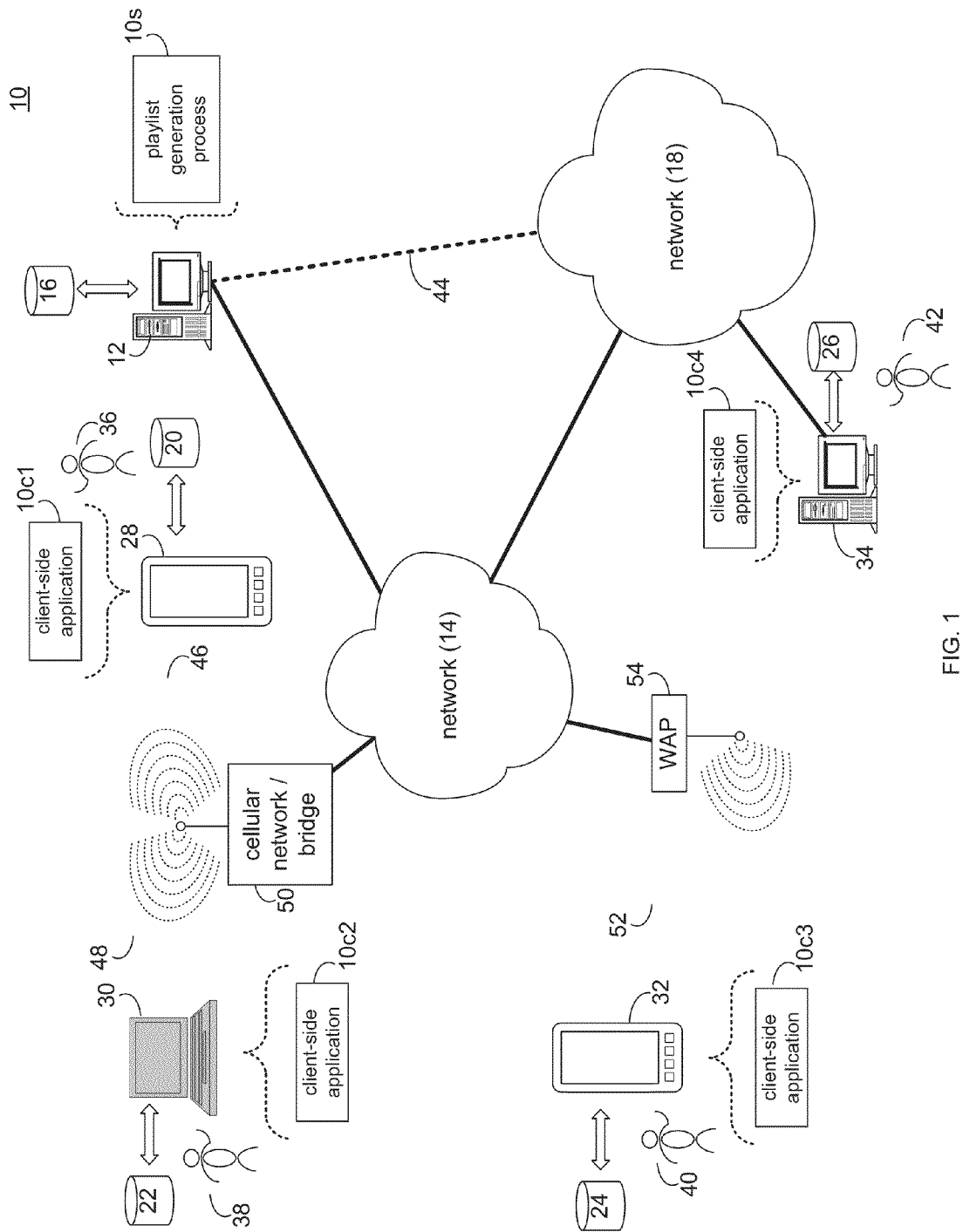
FIG. 1 is a diagrammatic view of a distributed computing network including a computing device that executes a playlist generation process.

Referring to FIG. 1, there is shown playlist generation process 10. For the following discussion, it is intended to be understood that playlist generation process 10 may be implemented in a variety of ways. For example, playlist generation process 10 may be implemented as a server-side process, a client-side process, or a server-side/client-side process.

For example, playlist generation process 10 may be implemented as a purely server-side process via playlist generation process 10s. Alternatively, playlist generation process 10 may be implemented as a purely client-side process via one or more of client-side application 10c1, client-side application 10c2, client-side application 10c3, and client-side application 10c4. Alternatively still, playlist generation process 10 may be implemented as a server-side/client-side process via playlist generation process 10s in combination with one or more of client-side application 10c1, client-side application 10c2, client-side application 10c3, and client-side application 10c4.

Accordingly, playlist generation process 10 as used in this disclosure may include any combination of playlist generation process 10s, client-side application 10c1, client-side application 10c2, client-side application 10c3, and client-side application 10c4.

Figure 2:
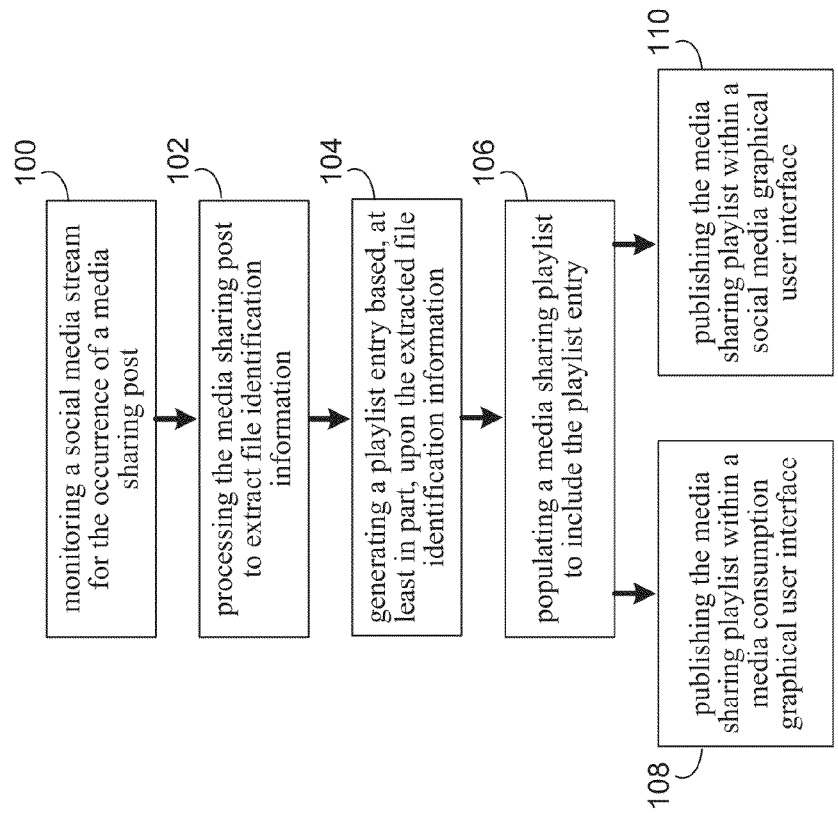
FIG. 2 is a flowchart of the playlist generation process of FIG. 1.

Referring also to FIG. 2 and as will be discussed below in greater detail, playlist generation process 10 may monitor 100 a social media stream for the occurrence of a media sharing post. Playlist generation process 10 may process 102 the media sharing post to extract file identification information. Playlist generation process 10 may generate 104 a playlist entry based, at least in part, upon the extracted file identification information and may populate 106 a media sharing playlist to include the playlist entry.

Playlist generation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of playlist generation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively).

Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a data-enabled television console (not shown), and a dedicated network device (not shown). Client electronic devices 28, 30, 32, 34 may each execute an operating system, examples of which may include but are not limited to Microsoft Windows™, Android™, WebOS iOS™, Redhat Linux™, or a custom operating system.

Users 36, 38, 40, 42 may access playlist generation process 10 directly through network 14 or through secondary network 18. Further, playlist generation process 10 may be accessed through secondary network 18 via link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. Additionally, personal computer 34 is shown directly coupled to network 18 via a hardwired network connection.

Figure 3:
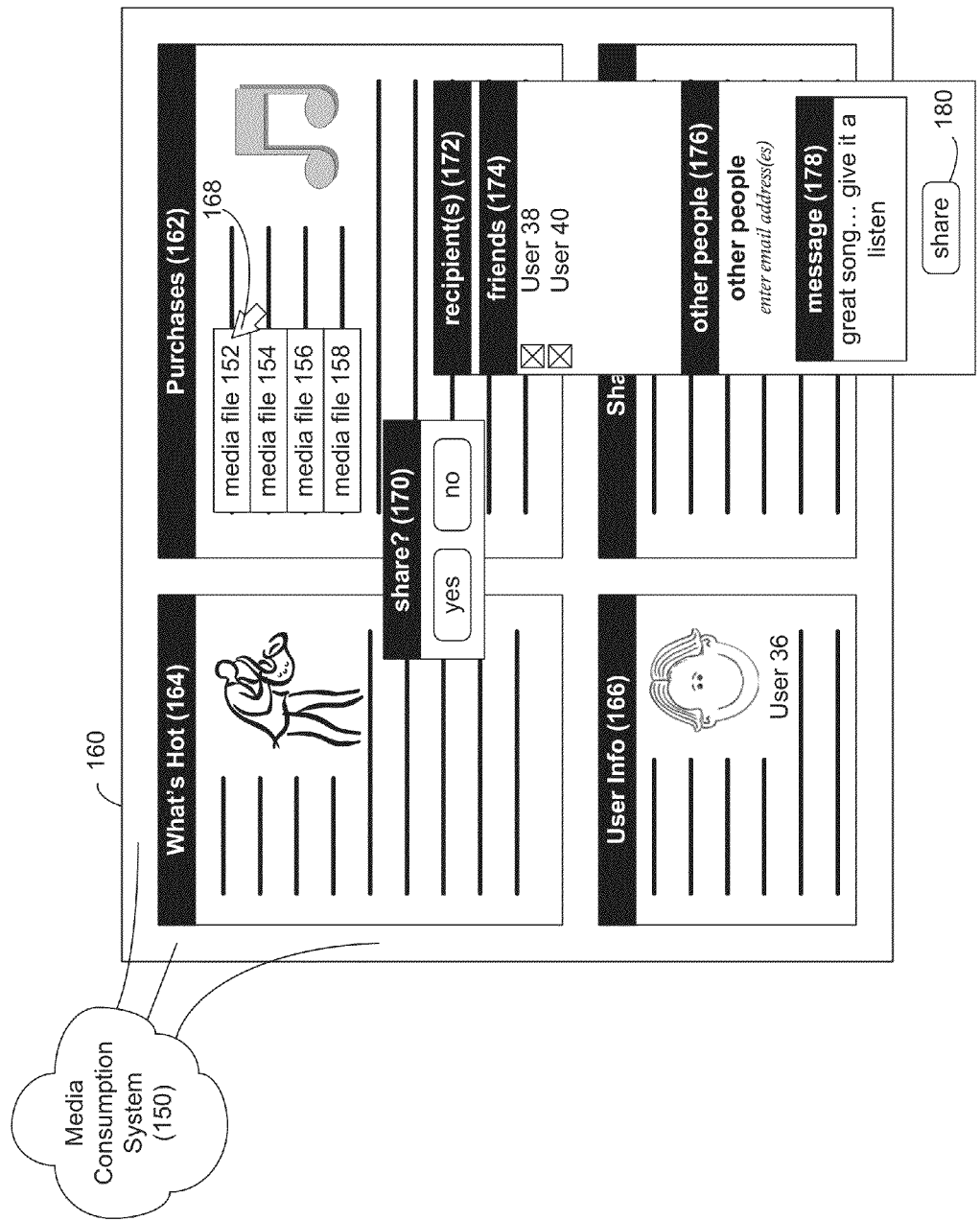
FIG. 3 is a graphical user interface of a media consumption system.

The Playlist Generation Process:

Referring also to FIG. 3, a user (e.g. user 36) of a media consumption system (e.g. media consumption system 150) may purchase one or more media files (e.g. media files 152, 154, 156, 158) for personal use. Examples of such media files may include but are not limited to music files (e.g. digitally encoded MP3 audio files) and/or video files (e.g. digitally encoded MOV video files).

As discussed above, when such media files are obtained (and depending upon the media consumption system that they are purchased from), the purchased media files may include a limited set of sharing rights, thus allowing the purchaser to share the media file on a limited basis via e.g., media sharing posts to social media streams.

Such limited sharing rights may allow the purchaser to "share" the purchased media file with the recipients so that the recipients may listen to/view the shared media file a limited number of times (e.g., a single time). Accordingly, the use of such a system may allow for the controlled "viral" sharing/distribution of media files across social networks.

Unfortunately and as discussed above, as users of social networks often have a considerable number of "friends", the quantity of "posts" made to their social media stream may be considerable and such media sharing posts may be lost amongst all of the general posts made within a user's social media stream.

Figure 4:
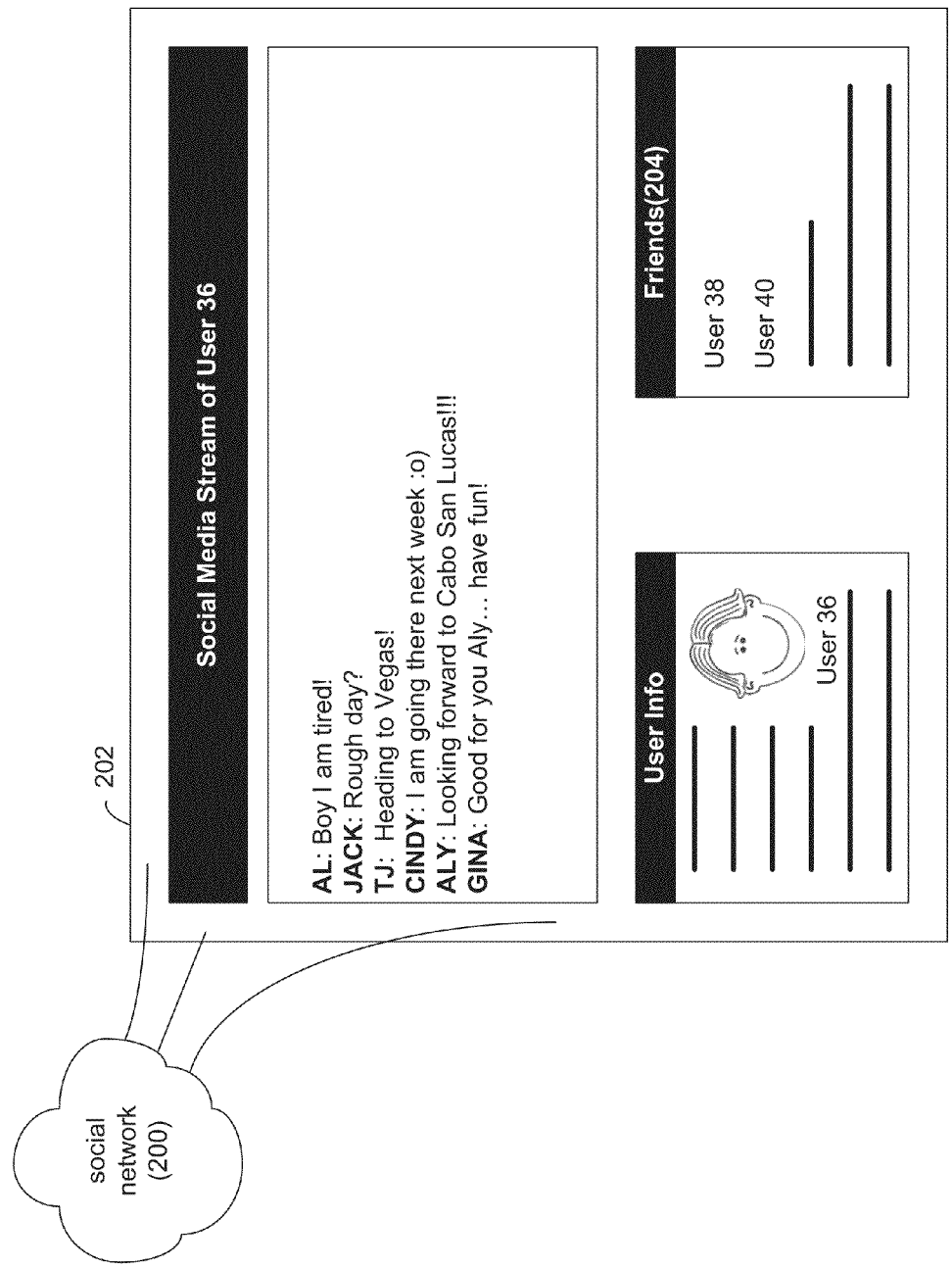
FIG. 4 is a graphical user interface of a social network.

For example and referring also to FIG. 4, assume that user 36 is a member of social network 200, which user 36 accesses via graphical user interface 202. Further, assume that user 36 has several friends (e.g. friends 204) that are arranged within the organization scheme of a social network. Assume for illustrative purposes that included within friends 204 of user 36 are users 38, 40.

Continuing with the above-stated example, assume for illustrative purposes that user 36 purchased media files 152, 154, 156, 158 (e.g. music files) and user 36 wishes to share media file 152 with users 38, 40 (who are included within the friends 204 of user 36 within social network 200).

User 36 may have purchased media files 152, 154, 156, 158 from one or more online music services that may effectuate the purchase of such media files. For example, this online music service may be an online sales service offered by/through media consumption system 150. Alternatively, this online music service may be a stand-alone service that is not associated with media consumption system 150. Further, social network 200 may be a social network that is not associated with the above-described online music service and/or music consumption system 150. Accordingly, user 36 may purchase media files 152, 154, 156, 158 from a first website associated with the above-described online music service. Media files 152, 154, 156, 158 may then be processed and rendered (i.e., played) via music consumption system 150 and then shared via a second website that is associated with social network 200. This second website may be different from (and not affiliated with) the first website that is associated with the above-described online music service.

Media consumption system 150 may render graphical user interface 160 on e.g. a display associated with data-enabled, cellular telephone 28. For illustrative purposes, graphical user interface 160 may include various sections, such as Purchases section 162, What's Hot section 164, and User Info section 166. Within Purchases section 162, a list of media files purchased by (in this example) user 36 may be itemized. In this particular illustrative example of Purchases section 162, four purchases (namely media files 152, 154, 156, 158) are itemized. What's Hot section 164 may: identify popular media files that are available for download by user 36; provide user 36 with various related news articles; and allow user 36 to purchase various related products (e.g. concert tickets). Within User Info section 166, the user of media consumption system 150 (e.g. user 36) may be able to define a profile for himself. For example, user 36 may e.g. define their complete name, e-mail address, physical address, likes/dislikes, favorite actors, favorite musicians, favorite movies, and favorite music.

As discussed above, assume that user 36 wishes to share media file 152 with users 38, 40 (who are included within friends 204 of user 36 within social network 200). Accordingly, user 36 may select (via on-screen pointer 168 that is controllable by a mouse, not shown) the appropriate media file (e.g. media file 152) from e.g. Purchases section 162 for sharing. For example, user 36 may "right-click" above the entry within Purchases section 162 that corresponds to media file 152, resulting in the rendering of sharing menu 170 by playlist generation process 10. Sharing menu 170 may be configured to allow user 36 to share (in this example) media file 152. If user 36 selects the "yes" button included within sharing menu 170 (with e.g. on-screen pointer 168), recipient menu 172 may be rendered by playlist generation process 10 that allows user 36 to select the people with whom they wish to share media file 152. For example, user 36 may be able to select (with e.g. on-screen pointer 168) users 38, 40.

As discussed above, playlist generation process 10 may be included within, executed within, or a portion of media consumption system 150 and/or social network 200. Accordingly, when rendering recipient menu 172, playlist generation process 10 may access the appropriate portion of social network 200 so that recipient menu 172 may be populated with some (or all) of the friends 204 of user 36 within social network 200. Therefore, playlist generation process 10 may be configured to access one or more databases (not shown) within social network 200.

Recipient menu 172 may have various areas that allow user 36 to select/define the intended recipients. For example, recipient menu 172 may include "friends" section 174, which may itemize one or more of friends 200 of e.g. user 36 within social network 200. Additionally, recipient menu 172 may include "other people" section 176 that may allow user 36 to identify intended recipients that user 36 is not friends with within social network 200. For example, "other people" section 176 may allow user 36 to define one or more e-mail addresses for intended recipients. Further, "message" section 178 may allow user 36 to insert a personal message that may be included within the media sharing post made within the social media streams for users 38, 40. For example, user 36 may define the message "great song . . . give it a listen", which may be included within any related media sharing posts made to the social media streams of users 38, 40.

When somebody is identified by e.g. user 36 as an intended recipient of the media sharing post, prior to being able to listen to the shared media file, the intended recipient may be required to install software and/or join a service. For example, prior to being able to listen to media file 152, users 38, 40 may be required to join (i.e. set up an account with) media consumption system 150 and/or social network 200.

Continuing with the above-stated example in which user 36 wishes to share media file 152 with users 38, 40 (who are included within friends 204 of user 36 within social network 200), assume for illustrative purposes that users 38, 40 each have an account with media consumption system 150. Accordingly, once user 36 identifies users 38, 40 as the parties with which they would like to share media file 152, user 36 (e.g. with on-screen pointer 168) may select "share" button 180.

Upon user 36 selecting the intended recipients (e.g. user 38, 40) of media file 152, playlist generation process 10 may generate media sharing post within the social media stream associated with user 38 and the social media stream associated with user 40. For the following discussion, the modification of the social media stream associated with user 38 will be described. However and while not discussed, the modification of the social media stream associated with user 40 would be performed in the same manner.

Figure 5:
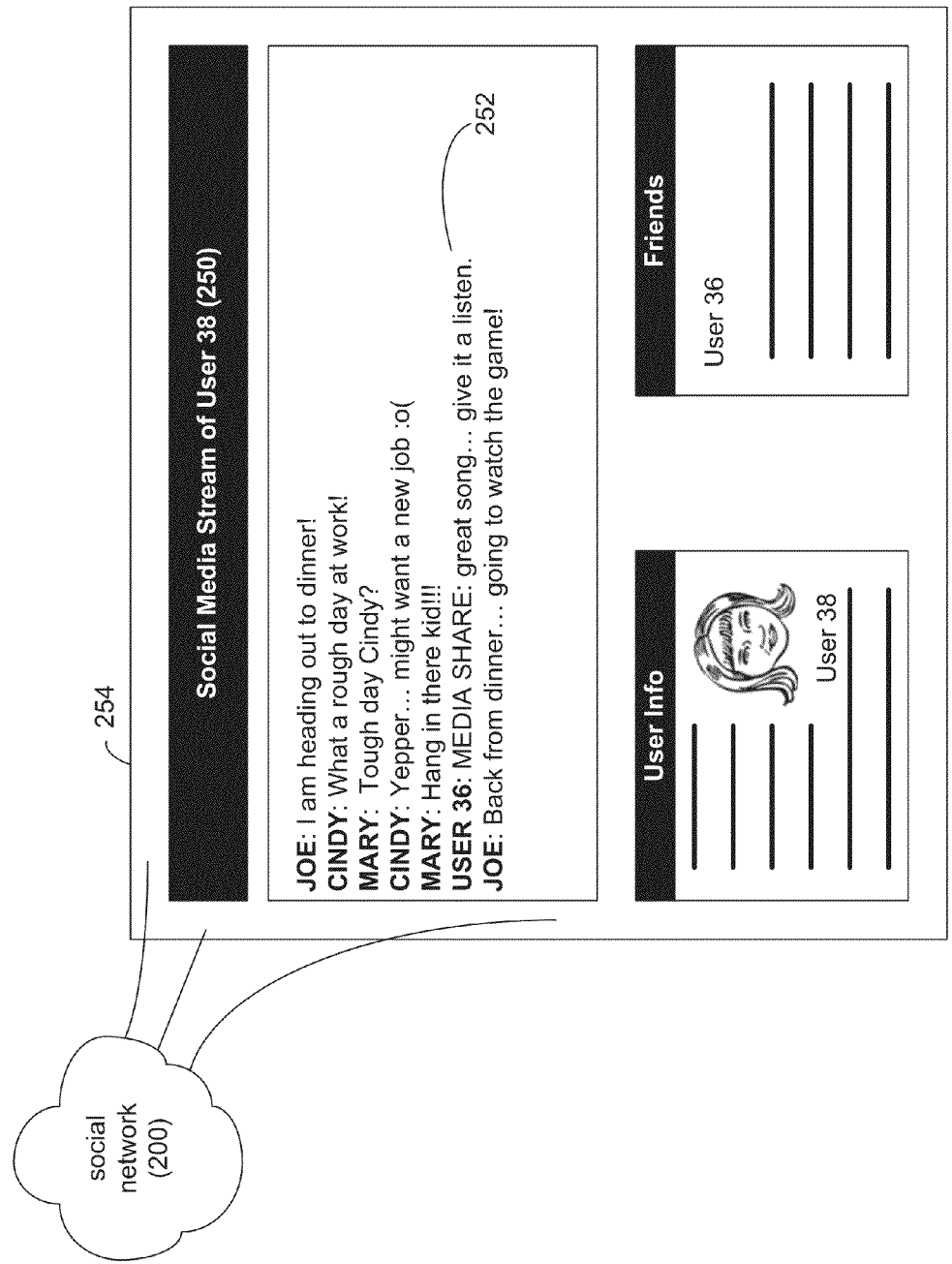
FIG. 5 is another graphical user interface of a social network.

Accordingly and referring also to FIG. 5, playlist generation process 10 may modify the social media stream (e.g. social media stream 250) of user 38 within social network 200 to include a media sharing post (e.g. post 252) related to the sharing of media file 152. Post 252 may define various pieces of information, some of which may not be shown within FIG. 5. For example, post 252 may define:
- a common identifier (e.g. the prefix MEDIASHARE) that identifies the post as a media sharing post;
- the name of the media file being shared;
- a URL that may point to the location of the media file being shared;
- one or more social media comments concerning the media sharing post and/or the media file being shared;
- the name of the party that shared the media file (i.e., a sharer identifier);
- the limited set of sharing rights associated with the media file being shared; and/or
- a URL that may point to an access control management platform that may regulate access to the media file being shared based upon the above-described sharing rights.

As discussed above, as users of social networks often have a considerable number of "friends", the quantity of "posts" made to their social media stream may be considerable and a media sharing post concerning the sharing of the media file may be lost amongst all of the general posts made to the user's social media stream.

Accordingly, playlist generation process 10 may monitor 100 social media stream 250 for the occurrence of a media sharing post (such as the sharing of a media file). For example, whenever user 38 launches media consumption system 150 and/or social network 200, playlist generation process 10 may monitor 100 social media stream 250 for the occurrence of these media sharing posts. As discussed above, these media sharing posts may include a common identifier (e.g. the prefix MEDIASHARE) that is included within each media sharing post. Accordingly, when playlist generation process 10 is monitoring 100 for the occurrence of a media sharing post within a social media stream, playlist generation process 10 may look for the presence of this common identifier within a post within social media stream 250. Assume for illustrative purposes that when monitoring 100 social media stream 250, playlist generation process 10 identifies post 252 as a media sharing post (as it includes the above-describe common identifier).

While playlist generation process 10 is described above as looking for the occurrence of the above-described prefix to determine whether a media sharing post is included within social media stream 250, this is for illustrative purposes only and is not intended to be a limitation of this disclosure, as other configurations are possible. For example, playlist generation process 10 may look for a post that includes a URL pointing to a known media consumption system.

Upon identifying a media sharing post, playlist generation process 10 may process 102 the media sharing post (e.g. post 252) to extract file identification information from the media sharing post. As discussed above, examples of the information included within post 252 may include but is not limited to:
- a common identifier (e.g. the prefix MEDIASHARE) that identifies the post as a media sharing post;
- the name of the media file being shared;
- a URL that may point to the location of the media file being shared;
- one or more social media comments concerning the post and/or the media file being shared;
- the name of the party that shared the media file (i.e., a sharer identifier);
- the limited set of sharing rights associated with the media file being shared; and/or
- a URL that may point to an access control management platform that may regulate access to the media file being shared based upon the above-described sharing rights.

Accordingly, playlist generation process 10 may extract such information from the media sharing post (e.g. post 252). Once such information is extracted from the media sharing post, playlist generation process 10 may generate 104 a playlist entry based, at least in part, upon the extracted information and may populate 106 a media sharing playlist to include the playlist entry.

Figure 6:
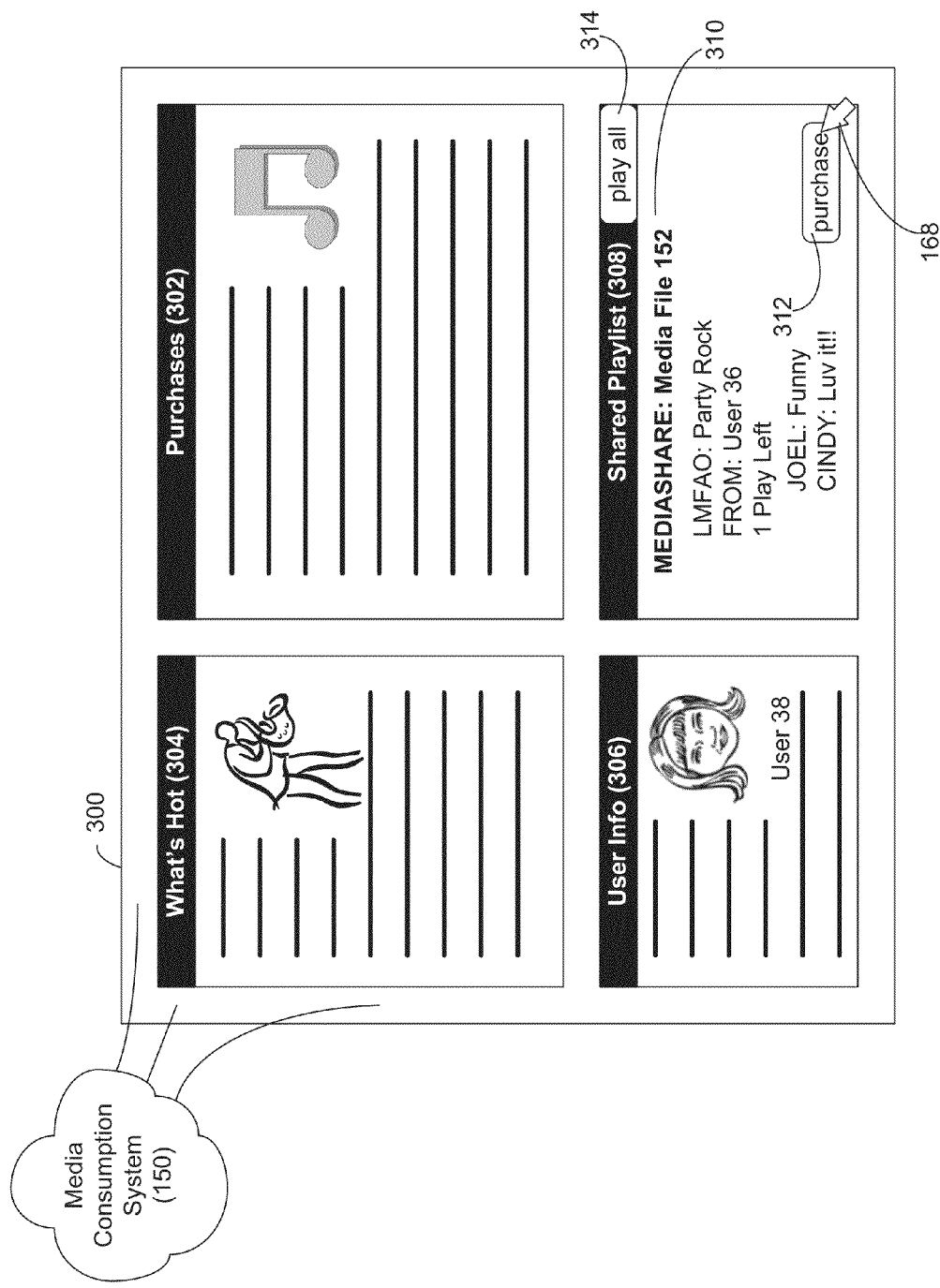
FIG. 6 is another graphical user interface of a media consumption system.

Referring also to FIG. 6, there is shown graphical user interface 300 of media consumption system 150 for user 38. As with the graphical user interface for user 36 (i.e., graphical user interface 160, FIG. 3), graphical user interface 300 may include various sections, such as Purchases section 302, What's Hot section 304, User Info section 306, and media sharing playlist section 308.

Within Purchases section 302, a list of media files purchased by (in this example) user 38 may be itemized. What's Hot section 304 may identify: popular media files that are available for download; provide the user with various related news articles; and allow the user to purchase various related products (e.g. concert tickets). Within User Info section 306, the user of media consumption system 150 (e.g. user 38) may be able to define a profile for herself.

As discussed above, playlist generation process 10 may extract information from the media sharing post (e.g. post 252), generate 104 a playlist entry based, at least in part, upon the extracted information, and populate 106 a media sharing playlist to include the playlist entry. Accordingly, playlist generation process 10 may generate 104 playlist entry 310 based, at least in part, upon the extracted information, and populate 106 media sharing playlist 310 to include playlist entry 308.

Accordingly, playlist generation process 10 may automatically extract pertinent information from media sharing posts (e.g. post 252) included within the social media stream (e.g. social media stream 250) of a user (e.g. user 38) so that media sharing playlist 308 may be automatically maintained and updated to include playlist entries (e.g. playlist entry 310) that defines the individual media files that were shared with (in this example) user 38 by other users of social network 200 (e.g. user 36).

While in this particular example, playlist generation process 10 is described above as publishing 108 media sharing playlist 308 within graphical user interface 300 of media consumption system 150, other configurations are possible and are considered to be within the scope of this disclosure. For example, playlist generation process 10 may publish 110 media sharing playlists 308 within graphical user interface 254 (See FIG. 5) of social network 200.

In a fashion similar to that of post 252, playlist entry 310 may include various pieces of information, examples of which may include but are not limited to:
- the name of the media file being shared (e.g., title/artist);
- a URL that may point to the location of the media file being shared (typically hidden);
- one or more social media comments concerning the post and/or the media file being shared (e.g., "Funny" and "Luv it!!");
- the name of the party that shared the media file (e.g., user 36);
- the limited set of sharing rights associated with the media file being shared (e.g., 1 play left);
- a purchase button (selectable by on-screen pointer 166) that may allow the user (e.g. user 38) to purchase the media file associated with playlist entry 308; and/or a URL that may point to an access control management platform that may regulate access to the media file being shared based upon the above-described sharing rights (typically hidden).

While the system is described above as allowing the user to play a particular media file in its entirety one time prior to having playback rights restricted, this is for illustrative purposes only and is not intended to be a limitation of this disclosure as other configurations are possible. For example, certain media files may be distributed that allow for unlimited plays during a defined period of time or indefinitely. This may occur when the media files are initial releases from a band's debut album and they are trying to generate a following. Further, other media files may be configured so that several plays are allowed (e.g. three plays) prior to having playback rights restricted.

As discussed above, once the initial play(s) of media file 152 are exhausted by e.g., user 38, the limited sharing rights associated with media file 152 may be configured so that media file 152 may only subsequently be listened to/viewed in a restricted fashion, such as only being able to listen to/view a small portion of media file 152 (e.g. several seconds to several minutes).

At this point in time, user 38 may choose to purchase media file 152 by selecting (with e.g., onscreen point 168) purchase button 312, which may result in user 38 purchasing a copy of media file 152 from media consumption system 150. Once purchased, Purchases section 302 of graphical user interface 300 may be populated by playlist generation process 10 to include an entry related to media file 152.

While media sharing playlist 308 is shown to include only a single entry (namely playlist entry 310), this is for illustrative purposes only and is not intended to be a limitation of this disclosure. Specifically, media sharing playlist 308 may typically include a plurality of entries. Accordingly and in this example, user 38 may select individual entries (e.g., playlist entry 310) for playing. Alternatively, user 38 may select (via onscreen pointer 166) play all button 314, which may result in all entries included within media sharing playlist 308 being played sequentially.

Figure 7:
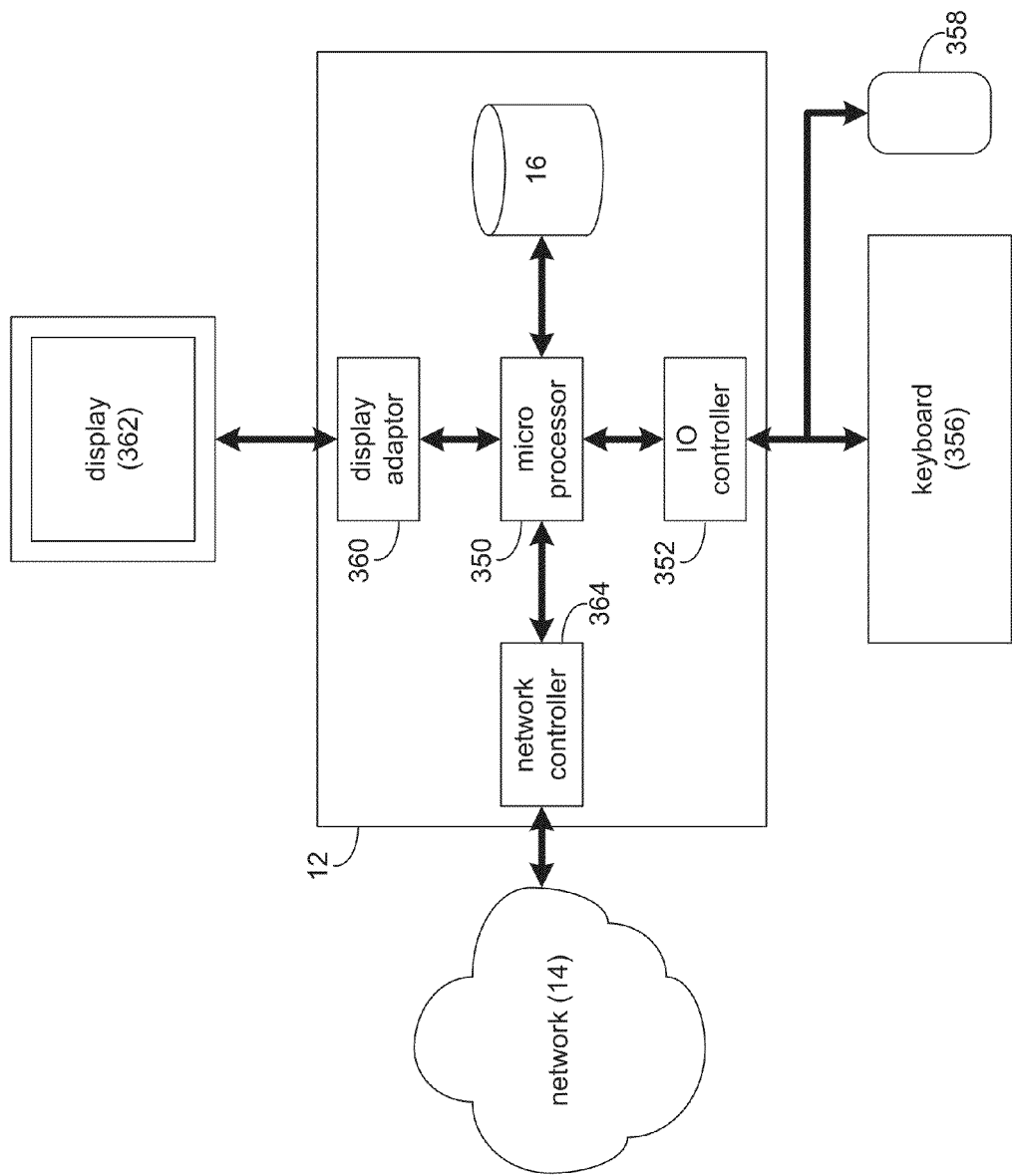
FIG. 7 is a diagrammatic view of the computing device of FIG. 1.

General:

Referring also to FIG. 7, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, playlist generation process 10 may be substituted for computing device 12 within FIG. 7, examples of which may include but are not limited to client electronic devices 28, 30, 32, 34.

Computing system 12 may include microprocessor 350 configured to e.g., process data and execute instructions/code for playlist generation process 10. Microprocessor 350 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 352 may be configured to couple microprocessor 350 with various devices, such as keyboard 354, mouse 356, USB ports (not shown), and printer ports (not shown). Display adaptor 360 may be configured to couple display 362 (e.g., a CRT or LCD monitor) with microprocessor 350, while network adapter 364 (e.g., an Ethernet adapter) may be configured to couple microprocessor 350 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 350) of a general purpose computer/special purpose computer/other programmable data processing apparatus (e.g., computing device 12), such that the instructions, which execute via the processor (e.g., processor 350) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving, by a computing device, a media sharing post from a first user;
   presenting the media sharing post from the first user in a social media stream of a second user, the social media stream of the second user including posts received from a plurality of users other than the first user and the second user;
   extracting, with the computing device, a file identification of a media file in the media sharing post from the first user;
   generating, with the computing device, a playlist entry based, at least in part, upon the extracted file identification information from the media sharing post of the social media stream of the second user; and
   populating, with the computing device, upon the occurrence of the media sharing post of the social media stream, and based upon, at least in part, the extracted file identification information from the media sharing post of the social media stream, a media sharing playlist comprising media files shared with the second user in the social media stream of the second user.

2. The computer-implemented method of claim 1 further comprising:
   publishing, with the computing device, the media sharing playlist within a media consumption graphical user interface.

3. The computer-implemented method of claim 1 further comprising:
   publishing, with the computing device, the media sharing playlist within a social media graphical user interface.

4. The computer-implemented method of claim 1 wherein the media files include one or more social media comments.

5. The computer-implemented method of claim 1 wherein the media files include a sharer identifier.

6. The computer-implemented method of claim 1 wherein the media sharing post defines a limited set of sharing rights for a shared media file.

7. The computer-implemented method of claim 6 wherein the shared media file includes one of a shared music file and a shared video file.

8. A computer program product residing on a computer readable medium having a plurality of instructions stored thereon which, when executed by a processor, cause the processor to perform operations comprising:
   receiving, by a computing device, a media sharing post form a first user;
   presenting the media sharing post from the first user in a social media stream of a second user, the social media stream of the second user including posts received from a plurality of users other than the first user and the second user;
   extracting, with the computing device, a file identification of a media file in the media sharing post from the first user;

generating, with the computing device, a playlist entry based, at least in part, upon the extracted file identification information from the media sharing post of the social media stream of the second user; and populating, with the computing device, upon the occurrence of the media sharing post of the social media stream, and based upon, at least in part, the extracted file identification information from the media sharing post of the social media stream, a media sharing playlist comprising media files shared with the second user in the social media stream of the second use.

9. The computer program product of claim 8 further comprising instructions for:
publishing, with the computing device, the media sharing playlist within a media consumption graphical user interface.

10. The computer program product of claim 8 further comprising instructions for:
publishing, with the computing device, the media sharing playlist within a social media graphical user interface.

11. The computer program product of claim 8 wherein the media files include one or more social media comments.

12. The computer program product of claim 8 wherein the media files include a sharer identifier.

13. The computer program product of claim 8 wherein the media sharing post defines a limited set of sharing rights for a shared media file.

14. The computer program product of claim 13 wherein the shared media file includes one of a shared music file and a shared video file.

15. A computing system comprising:
at least one processor;
at least one memory architecture coupled with the at least one processor;
one or more software modules executed on the at least one processor and the at least one memory architecture, wherein the one or more software modules are configured to perform operations including:
receiving, by a computing device, a media sharing post from a first user;
presenting the media sharing post from the first user in a social media stream of a second user, the social media stream of the second user including posts received from a plurality of users other than the first user and the second user;
extracting, with the computing device, a file identification of a media file in the media sharing post from the first user;
generating, with the computing device, a playlist entry based, at least in part, upon the extracted file identification information from the media sharing post of the social media stream of the second user; and
populating, with the computing device, upon the occurrence of the media sharing post of the social media stream, and based upon, at least in part, the extracted file identification information from the media sharing post of the social media stream, a media sharing playlist comprising media files shared with the second user in the social media stream of the second use.

16. The computing system of claim 15 further configured to perform operations comprising:
publishing, with the computing device, the media sharing playlist within a media consumption graphical user interface.

17. The computing system of claim 15 further configured to perform operations comprising:
publishing, with the computing device, the media sharing playlist within a social media graphical user interface.

18. The computing system of claim 15 wherein the media files include one or more social media comments.

19. The computing system of claim 15 wherein the media files include a sharer identifier.

20. The computing system of claim 15 wherein the media sharing post defines a limited set of sharing rights for a shared media file.

21. The computing system of claim 20 wherein the shared media file includes one of a shared music file and a shared video file.

22. The method of claim 1, wherein each post in the plurality of posts in the social media stream of the second user identifies a single media file shared with the second user by one of the plurality of other users.

23. The method of claim 1, wherein the social media stream of the second user includes a plurality of posts that do not identify any media files shared with the user.

* * * * *